US009209586B2

(12) United States Patent
Morris et al.

(10) Patent No.: US 9,209,586 B2
(45) Date of Patent: Dec. 8, 2015

(54) FEED MECHANISM FOR A TERMINAL CRIMPING MACHINE

(71) Applicant: Tyco Electronics Corporation, Berwyn, PA (US)

(72) Inventors: Michael Morris, Harrisburg, PA (US); Neil Edward Deming, Lewisberry, PA (US); Aaron Scott Will, Enola, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 170 days.

(21) Appl. No.: 13/957,570

(22) Filed: Aug. 2, 2013

(65) Prior Publication Data

US 2015/0033526 A1 Feb. 5, 2015

(51) Int. Cl.
*B23P 19/00* (2006.01)
*H01R 43/042* (2006.01)
*H01R 43/055* (2006.01)

(52) U.S. Cl.
CPC ......... *H01R 43/055* (2013.01); *Y10T 29/49185* (2015.01); *Y10T 29/5193* (2015.01)

(58) Field of Classification Search
CPC .. H01R 43/055; H01R 12/69; H01R 13/5812; H01R 43/048; H01R 43/0488; H01R 43/052; H01R 43/16; H01R 43/20; H01R 4/20; Y10T 29/53235; Y10T 29/49181; Y10T 29/49185; Y10T 29/5142; Y10T 29/5149
USPC .......................... 29/753, 33 M, 751, 760, 863
See application file for complete search history.

(56) References Cited

U.S. PATENT DOCUMENTS

| | | | | |
|---|---|---|---|---|
| 5,127,255 | A | 7/1992 | Skotek | |
| 6,327,775 | B1 * | 12/2001 | Oishi et al. | 29/751 |
| 6,530,257 | B2 * | 3/2003 | Ooji et al. | 72/420 |
| 2003/0110619 | A1 | 6/2003 | Turek et al. | |

FOREIGN PATENT DOCUMENTS

WO 98/09356 A2 3/1998

OTHER PUBLICATIONS

International Search Report, International Application No., PCT/US2014/049134, International Filing Date, Jul. 31, 2014.

* cited by examiner

*Primary Examiner* — Thiem Phan

(57) ABSTRACT

A feed mechanism for a terminal crimping machine includes a feed track and a strip locator. The feed track has a top plate and a side wall. The top plate extends from a front of the feed track to a rear of the feed track. The top plate is configured to receive thereon a terminal strip having a plurality of terminals arranged along a carrier strip. The terminal strip is configured to be moved from the rear to the front towards a crimping zone of the terminal crimping machine. The side wall has a fixed edge above the top plate. The strip locator is coupled to the feed track. The strip locator has a rail movably coupled to a support wall. The support wall is fixed relative to the feed track. The rail is biased against the terminal strip to force the terminal strip against the fixed edge of the side wall.

20 Claims, 5 Drawing Sheets

FEED MECHANISM FOR A TERMINAL CRIMPING MACHINE

BACKGROUND OF THE INVENTION

The subject matter herein relates generally to terminal feed mechanisms for terminal crimping machines.

Electrical terminals are typically crimped onto wires by an applicator of a terminal crimping machine to form a lead. In operation, a terminal is placed in a crimping zone, and a wire is inserted into the ferrule or barrel of the terminal. A ram is caused to move along a crimp stroke toward the base, thereby crimping the terminal onto the wire. The terminals, prior to crimping, are typically provided in strip form. The strip of terminals (e.g., terminal strip) is manually loaded into the crimping machine by an operator. The position of the terminal strip is important to overall performance because terminal strip positioning directly affects the presentment of the attached terminal that is located within the crimping zone. A terminal that is not properly located in either the side-to-side or front-to-back directions of the crimping zone will not meet crimp specifications after it is crimped to a wire. Leads that do not meet crimp specifications are discarded.

At present, mechanisms that guide the terminal strip towards the crimping zone are adjusted at the manufacturing facility and fastened in place. In use, even slight variations in the size and/or dimensions of the terminals and/or terminal strip require a manual guide adjustment process that includes applicator disassembly, terminator strip guide adjustment, reassembly of the applicator, and finally adjustment to a feeder device that feeds the terminal strip to the crimping zone. This guide adjustment process is complex, time-consuming, and reduces efficiency as no leads can be produced while the adjustments are being made.

Another issue with terminal guide mechanisms is that they often require an additional component, sometimes referred to as a drag, that acts as a brake to prevent the terminal strip from unintentional movement in a reverse direction away from the crimping zone. For example, the feeder device may have an extension that mechanically forces the terminal strip towards the crimping zone, but as the extension lifts off of the strip to cycle back and begin a new repetition, the extension may catch a part of the strip and pull it at least slightly away from the crimping zone, potentially misaligning the terminal in the crimping zone. A drag component may be installed to prevent such rearward movement of the terminal strip, but it is an additional component which adds an additional cost and further complicates the adjustment process.

A need remains for a feed mechanism for a terminal crimping machine that simplifies if not eliminates guide adjustment and removes the need for a drag component.

BRIEF DESCRIPTION OF THE INVENTION

In an embodiment, a feed mechanism for a terminal crimping machine is provided that includes a feed track and a strip locator. The feed track has a top plate and a side wall. The top plate extends from a front of the feed track to a rear of the feed track. The top plate is configured to receive thereon a terminal strip having a plurality of terminals arranged along a carrier strip. The terminal strip is configured to be moved from the rear to the front towards a crimping zone of the terminal crimping machine. The side wall has a fixed edge above the top plate. The strip locator is coupled to the feed track. The strip locator has a rail movably coupled to a support wall. The support wall is fixed relative to the feed track. The rail is biased against the terminal strip to force the terminal strip against the fixed edge of the side wall.

In another embodiment, a feed mechanism for a terminal crimping machine is provided that includes a feed track, a feeder device, and a strip locator. The feed track has a top plate and a side wall. The top plate extends from a front of the feed track to a rear of the feed track. The top plate is configured to receive thereon a terminal strip having a plurality of terminals arranged along a carrier strip. The side wall has a fixed edge above the top plate. The feeder device includes a feed actuator operatively connected to a feed finger. The feed actuator is configured to cause the feed finger to mechanically advance the terminal strip from the rear to the front towards a crimping zone of the terminal crimping machine. The strip locator is coupled to the feed track. The strip locator has a rail movably coupled to a support wall. The support wall is fixed relative to the feed track. The rail is biased against the terminal strip to force the terminal strip against the fixed edge of the side wall.

In another embodiment, an applicator for a terminal crimping machine is provided that includes a crimping mechanism, a feed track, a feeder device, and a strip locator. The crimping mechanism includes an anvil and a movable ram. The anvil is located in a crimping zone and is configured to receive a terminal thereon. The ram has crimp tooling that is configured to crimp the terminal located on the anvil to a wire during a crimp stroke of the ram. A feed track has a top plate and a side wall. The top plate extends from a front of the feed track to a rear of the feed track. The top plate is configured to receive thereon a terminal strip having a plurality of terminals arranged along a carrier strip. The side wall has a fixed edge above the top plate. The feeder device includes a feed actuator operatively connected to a feed finger. The feed actuator is configured to cause the feed finger to mechanically advance the terminal strip from the rear to the front towards the crimping zone. The strip locator is coupled to the feed track. The strip locator has a rail movably coupled to a support wall. The support wall is fixed relative to the feed track. The rail is biased against the terminal strip to force the terminal strip against the fixed edge of the side wall.

DETAILED DESCRIPTION OF THE INVENTION

Figure 1:
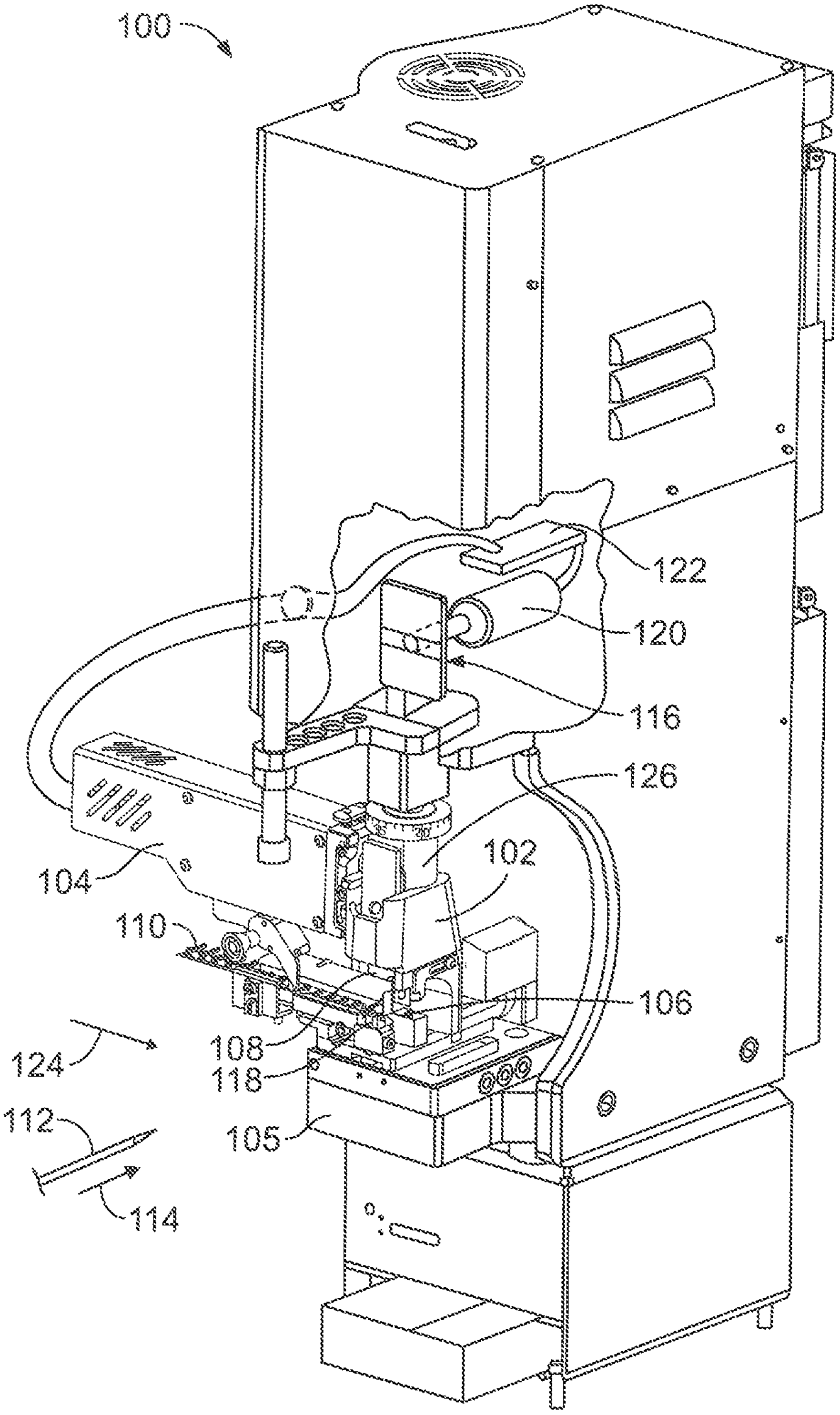
FIG. 1 is a perspective view of a terminal crimping machine according to an exemplary embodiment.

FIG. 1 is a perspective view of a crimping machine 100 having an applicator 102. The crimping machine 100 is illustrated as a terminal crimping machine used for crimping connectors to wires. However, other types of machines may be used, such as an insulation displacement connector (IDC) machine, a welding machine, and the like, that attach connectors to wires using processes other than crimping. Alternatively, the crimping machine 100 may be another type of crimping machine such as a lead frame machine.

The applicator 102 is coupled to a support 105 of the crimping machine 100. The applicator 102 may be removed and replaced with a different applicator, such as when the applicator 102 is worn or damaged or when an applicator having a different configuration is desired. The applicator 102 has a terminating zone or crimping zone 106 with mechanical tooling for crimping electrical connectors or terminals 110 to an end of a wire 112. The mechanical tooling used for crimping includes an anvil 118 and a ram 126. The anvil 118 is a stationary component of the applicator 102, and the ram 126 represents a movable component.

The applicator 102 includes a feeder device 104 that is positioned to feed the terminals 110 to the crimping zone 106. The feeder device 104 may be positioned adjacent to the mechanical crimping tooling in order to deliver the terminals 110 to the crimping zone 106. The terminals 110 may be guided to the crimping zone 106 by a feed mechanism (shown in FIG. 2), as described further herein, to ensure proper placement and orientation of the terminal 110 in the crimping zone 106. The wire 112 is delivered to the crimping zone 106 by a wire feeder (not shown) or a bench machine (not shown) in a wire loading direction 114.

The crimping machine 100 may be configured to operate using side-feed type applicators and/or end-feed type applicators. Side-feed type applicators crimp terminals that are arranged side-by-side along a carrier strip, while end-feed type applicators crimp terminals that are arranged successively, end-to-end on a carrier strip. For example, in a side-feed type applicator, a feed direction 124 of the terminals 110, representing the direction the feeder device 104 advances the terminals 110 towards the crimping zone 106, is perpendicular to the wire loading direction 114. The applicator 102 illustrated in FIG. 1 is a side-feed type applicator 102 as the terminals 110 are arranged side-by-side and perpendicularly to the wire loading direction 114. In an end-feed type applicator, however, the feed direction of the terminals is parallel to the wire loading direction 114, although typically in the opposite direction. For example, the end-feed terminals may be located on a track that is on the other side of the applicator as the wire feeder such that the terminals are fed to the crimping zone 106 in the opposite direction as the wire being fed to the crimping zone 106. The crimping machine 100 may be configured to accommodate both side-feed and end-feed types of applicators, which may be interchangeable within the crimping machine 100.

During a crimping operation, the ram 126 of the applicator 102 is driven through a crimp stroke by a driving mechanism 116 of the crimping machine 100 initially towards the stationary anvil 118 and finally away from the anvil 118. Thus, the crimp stroke has both a downward component and an upward component. The crimping of the terminal 110 to the wire 112 occurs during the downward component of the crimp stroke. First, a terminal 110 is loaded onto the anvil 118 in the crimping zone 106, and an end of the wire 112 is fed within a ferrule or barrel of the terminal 110. The ram 126 is then driven downward along the crimp stroke towards the anvil 118. The ram 126 includes crimp tooling 108 that engages the barrel of the terminal 110. The crimp tooling 108 crimps the terminal 110 onto the wire 112 by compressing or pinching the terminal 110 between the crimp tooling 108 and the anvil 118. In an exemplary embodiment, the driving mechanism 116 is driven by a crimping machine actuator 120. Optionally, the crimping machine actuator 120 may be an electric motor having a drive shaft that moves the driving mechanism 116. Alternatively, the crimping machine actuator 120 may be a linear actuator, a piezoelectric actuator, a pneumatic actuator, and the like. The operation of the crimping machine actuator 120 is controlled by a control module 122. Optionally, the control module 122 also controls the operation of the feeder device 104 and synchronizes the timing of the crimp stroke with the timing of a feed stroke of the feeder device 104. Each feed stroke of the feeder device 104 delivers a terminal 110 into the crimping zone 106. Thus, after one terminal 110 within the crimping zone 106 is crimped to wire to form a lead, the subsequent feed stroke expels the crimped terminal 110 from the crimping zone 106 and loads a new terminal 110 into the crimping zone 106 to perform another crimping operation.

Figure 2:
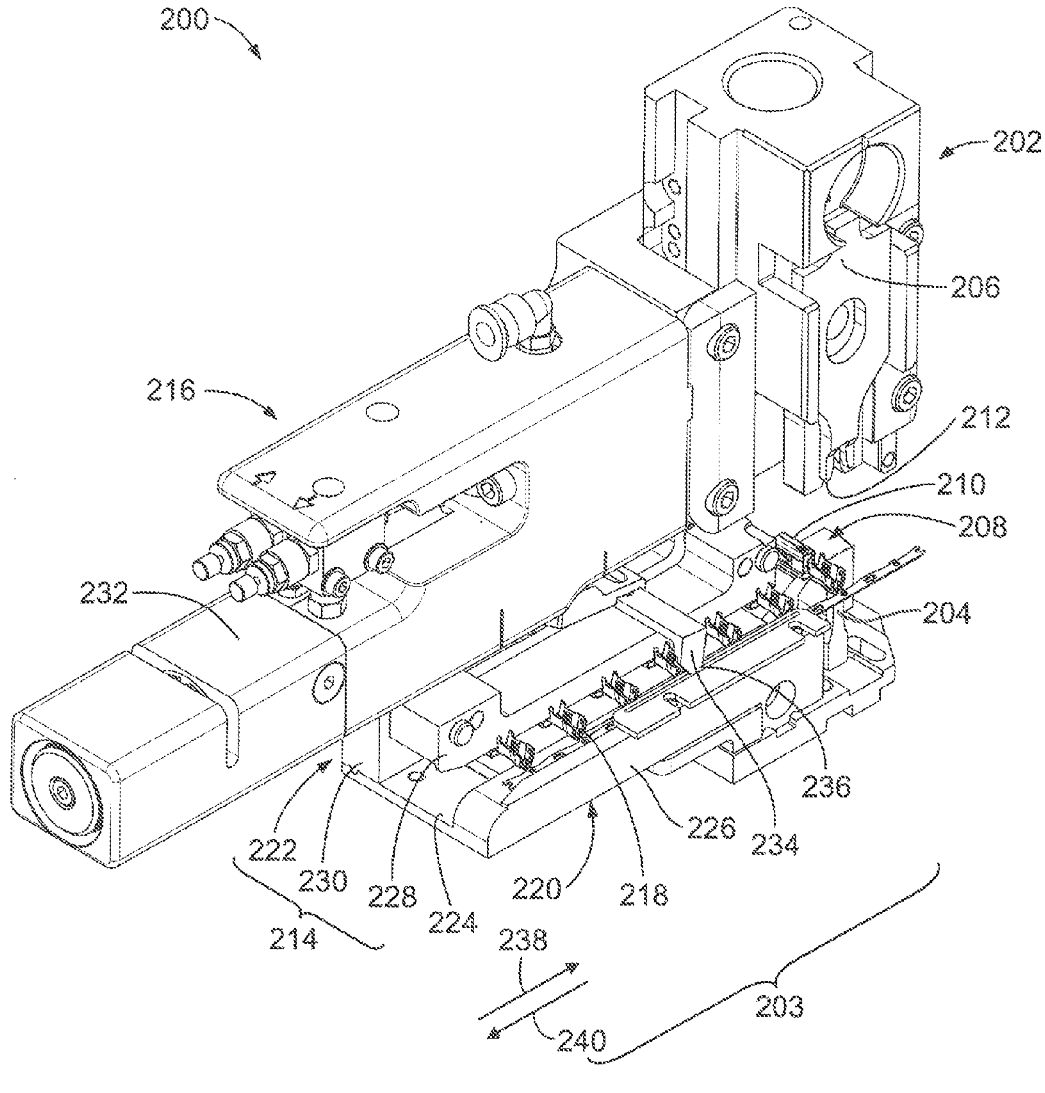
FIG. 2 is a perspective view of an applicator according to an exemplary embodiment.

FIG. 2 is a perspective view of an applicator 200 according to an exemplary embodiment. The applicator 200 may be similar to the applicator 102 shown in FIG. 1. The applicator 200 includes a crimping mechanism 202 and a feed mechanism 203. The crimping mechanism 202 includes an anvil 204 and a movable ram 206. The anvil 204 is located in a crimping zone 208 and configured to receive a terminal 210 thereon. The ram 206 includes crimp tooling 212 that is configured to crimp the terminal 210 located on the anvil 204 to a wire 112 (shown in FIG. 1) during a crimp stroke of the ram 206. The applicator 200 is shown as a side-feed type applicator, although alternatively an end-feed type applicator may be used.

In an embodiment, the feed mechanism 203 includes a feed guide 214 and a feeder device 216. The feed guide 214 is configured to receive thereon a plurality of the terminals 210 attached along a common terminal strip 218. The feed guide 214 provides a path towards the crimping zone 208. The feeder device 216 is configured to propel the terminal strip 218 towards the crimping zone 208 along the path provided by the feed guide 214. The feed mechanism 203 is configured to properly position and orient each terminal 210 within the crimping zone 208 relative to the mechanical crimping tooling (e.g., anvil 204, crimp tooling 212, etc.) and to the wire feeder in order to produce leads that meet all standards and/or specifications (e.g., and do not get discarded).

The feed guide 214 further includes a feed track 220 and a strip locator 222. The feed track 220 includes a top plate 224 and a side wall 226 that extends upwards from a planar surface of the top plate 224. The top plate 224 and side wall 226 extend toward the crimping mechanism 202. In an embodiment, the terminal strip 218 is placed onto the top plate 224, and the strip locator 222 provides a biasing force that forces the terminal strip 218 into contact with the side wall 226 of the feed track 220. The feed guide 214 thus provides a path defined between the side wall 226 and the strip locator 222 for the terminal strip 218 towards the crimping zone 208 within the crimping mechanism 202. Since the terminal strip 218 is forced into contact with the side wall 226 by the strip locator 222, the advancement of the terminal strip 218 follows the trajectory of the side wall 226 towards the crimping zone 208. The strip locator 222 includes a rail 228 coupled to a support wall 230 that is fixed relative to the feed track 220. Although the support wall 230 is fixed relative to the feed track 220, the rail 228 is movable relative to the support wall 230 and the feed track 220. The rail 228 is configured to contact the terminal strip 218, and the rail 228 is biased to force the terminal strip 218 against the side wall 226.

The feeder device 216 includes a feed actuator 232 operatively connected to a feed finger 234. The feed actuator 232 is configured to induce motion in the feed finger 234 to cause the feed finger 234 to move along a prescribed feed stroke to mechanically advance the terminal strip 218 towards the crimping zone 208. The feed actuator 232 may be an electric motor, a pneumatic actuator, a hydraulic piston, a linear actuator, a piezoelectric actuator, and the like. The operation of the feed actuator 232 is controlled by a control module, such as control module 122 (shown in FIG. 1). Alternatively, the feed actuator 232 may be the crimping machine actuator 120 (shown in FIG. 1), and the feed finger 234 may be operatively connected to the crimping mechanism 202, such that movement of the ram 206 causes movement of the feed finger 234.

The feed finger 234 may extend downward and/or outward from the feeder device 216. The feed finger 234 includes a tip 236 at a distal end thereof that engages the terminal strip 218. The feed finger 234 engages the terminal strip 218 and moves in a feed direction 238 to push the terminals 210 one by one into the crimping zone 208. Each feed stroke of the feed finger 234 involves engaging the terminal strip 218 and pushing the terminal strip 218 a set distance in the feed direction 238, and each feed stroke is followed by disengagement of the terminal strip 218 and movement in a reverse feed direction 240 in order to begin a new feed stroke. The amount of travel of the feed finger 234 (e.g., the distance that the terminal strip 218 moves) during each feed stroke is adjustable, for example to accommodate different terminals, different crimping mechanisms, different operating conditions, and/or the like. The feed finger 234 is adjusted such that each feed stroke advances the terminal strip 218 a distance in the feed direction 238 that delivers one of the terminals 210 into the crimping zone 208.

Figure 3:
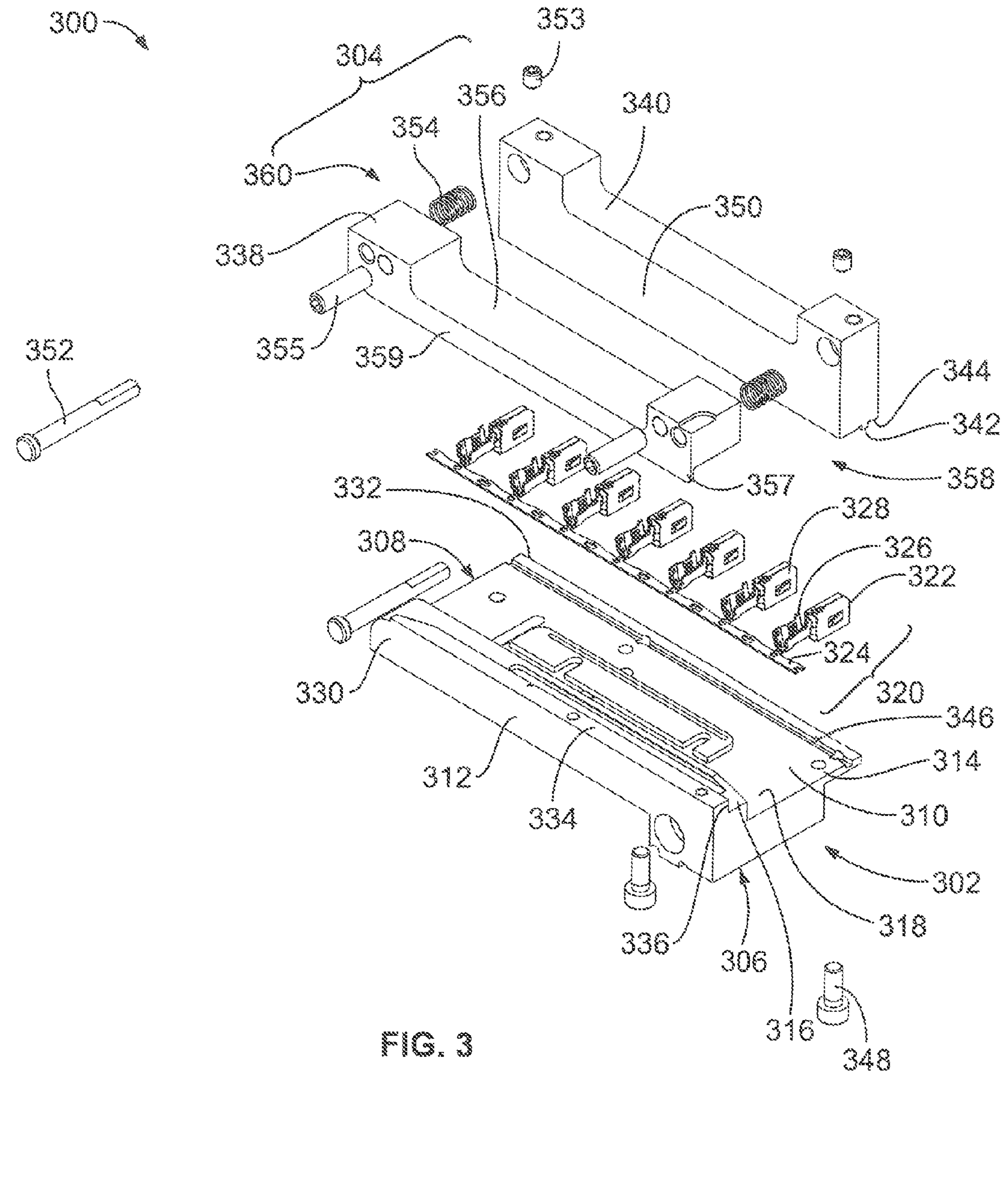
FIG. 3 is an exploded view of a feed mechanism according to an exemplary embodiment.

FIG. 3 is an exploded view of a feed mechanism 300 according to an exemplary embodiment. The feed mechanism 300 may be similar to the feed guide 214 shown in FIG. 2. The feed mechanism 300 includes a feed track 302 and a strip locator 304. The feed track 302 has a front 306 and a rear 308. The front 306 is located proximate to the crimping mechanism 202 (shown in FIG. 2), such that the anvil 204 (shown in FIG. 2) in the crimping zone 208 (shown in FIG. 2) is located in front of the front 306 of the feed track 302. The feed track 302 may be composed of a rigid material, such as plastic, metal, and the like, and formed, for example, by an injection molding process or the like. The feed track 302 further includes a top plate 310 and a side wall 312. The top plate 310 has a planar surface 318 at a top 314 of the feed track 302 that extends from the front 306 to the rear 308. The top plate 310 is configured to receive thereon at least a portion of a terminal strip 320. The terminal strip 320 may be loaded onto the top plate 310, and the terminal strip 320 may be advanced towards the front 306 of the feed track 302 and into the crimping zone 208 of the crimping mechanism 202. In an exemplary embodiment, the top plate 310 includes a shoulder 316 which is a portion (e.g., strip) of the top plate 310 that is stepped up from (e.g., raised above) the planar surface 318 of the top plate 310. The shoulder 316 may also have a planar top surface that extends from the front 306 of the feed track 302 to the rear 308. The shoulder 316 may be configured to receive thereon at least a portion of the terminal strip 320. Alternatively, the top plate does not include a stepped up shoulder.

In an exemplary embodiment, the terminal strip 320 includes a plurality of terminals 322 arranged along a carrier strip 324. The terminals 322 and attached carrier strip 324 may be stamped and formed of a conductive material, such as metal. The terminals 322 may be side-feed terminals that are arranged side-by-side, and each extends perpendicularly from the length of the carrier strip 324. For example, each terminal 322 may attach to the carrier strip 324 at a distal end of a barrel 326, where the barrel 326 is configured to receive the wire 112 (shown in FIG. 1) during the crimping operation. The barrels 326 shown in FIG. 3 are winged, although in alternative embodiments the barrels may have a closed cylindrical shape (e.g., barrel-shaped). Each terminal 322 may further include a terminal body 328 attached to an opposite side of the barrel 326 from the carrier strip 324 that is configured to connect with other leads and/or electrical components.

The feed track 302 further includes a first side 330 and an opposite second side 332. In an exemplary embodiment, the side wall 312 extends along the first side 330 from the front 306 of the feed track 302 to the rear 308. The side wall 312 is a raised portion of the feed track that is stepped up from the top plate 310. The side wall 312 includes a top surface 334 and a fixed edge 336 that is a vertical surface between the top surface 334 and the top plate 310 (e.g., below the top surface 334 and above the top plate 310). The fixed edge 336 may be adjacent to the shoulder 316 of the top plate 310. For example, the height of the fixed edge 336 is the distance that the side wall 312 is stepped up from the shoulder 316 of the top plate 310. The fixed edge 336 may be perpendicular to the top surface 334 of the side wall 312 and/or to the shoulder 316 of the top plate 310. The terminal strip 320 loaded on the shoulder 316 may be biased into contact with the fixed edge 336 of the side wall 312. The fixed edge 336 may have a smooth and rigid surface. The fixed edge 336 is configured to guide the terminal strip 320 towards the crimping mechanism 202 (shown in FIG. 2) such that the terminal 322 in the crimping zone 208 (shown in FIG. 2) is accurately positioned side-to-side (e.g., between the first side 330 and the second side 332) and is accurately oriented to align with the anvil 204 (shown in FIG. 2), crimp tooling 212 (shown in FIG. 2), and/or incoming fed wire 112 (shown in FIG. 1).

The strip locator 304 is configured to be coupled to the feed track 302. The strip locator 304 includes a rail 338 that is coupled to a support wall 340. The support wall 340 is configured to be joined to the feed track 302 and fixed (e.g., without any translational or rotational movement) relative to the feed track 302. The support wall 340 may be composed of a rigid material, such as a metal, a plastic, and the like. In an exemplary embodiment, the support wall 340 may be joined to the top plate 310 of the feed track 302 proximate to the second side 332 and extend along the feed track 302 from the front 306 to the rear 308. The support wall 340 may include a protrusion 342 located along a bottom surface 344 of the support wall 340 that is configured to be received in a groove 346 defined along the planar surface 318 of the top plate 310 proximate to the second side 332. The protrusion 342 and corresponding groove 346 are configured to align the support wall 340 with the feed track 302 such that the support wall 340 extends parallel to the side wall 312 in the longitudinal direction from the front 306 to the rear 308 of the feed track 302. The protrusion 342 may be a single ridge that extends the longitudinal length of the support wall 340. Alternatively, the protrusion 342 may be one or more keying features other than or in addition to a ridge, such as various dents and/or indents which are mirrored in the surface 318 of the top plate 310. As shown in FIG. 3, the top plate 310 may include one or more holes in addition to, or instead of, the groove 346 which are sized to receive fasteners 348 therethrough to fasten the support wall 340 to the feed track 302. The fasteners 348 may be bolts, screws, rivets, anchors, and the like. In alternative embodiments, the support wall 340 may be pre-formed with the feed track 302 (e.g., as with the side wall 312), or the support wall 340 may be fixed to the feed track 302 via adhesive, welding, soldering, and the like.

The rail 338 is movably coupled to the support wall 340 along a first side 350 of the support wall 340. The rail 338 may have an elongated body 356 with a longitudinal length that is similar in length to the support wall 340. In an exemplary embodiment, the rail 338 includes a lip 357, located along a first side 359, that extends downward (e.g., toward the feed track 302). Although the support wall 340 is fixed relative to the feed track 302, the rail 338 is moveable relative to the support wall 340 and/or feed track 302. For example, the rail 338 is movable toward and away from the side wall 312 of the feed track 302. The rail 338 is located between the support wall 340 and the side wall 312 of the feed track 302 and biased towards the side wall 312. The rail 338 is biased by a biasing mechanism that forces the rail 338 towards the side wall 312. In an exemplary embodiment, the biasing mechanism is one or more spring-loaded pins 352 (e.g., pins 352 in operation with springs 354). Each of the pins 352 extends through the rail 338 and into the support wall 340 to couple the rail 338 to the support wall 340. The pins 352 may be anchored to the support wall 340 using a locking fastener 353, such as set screws, inserted into the support wall 340 that engages the pins 352 to retain the pins 352 within the support wall 340. The rail 338 is configured to slide along the pins 352 relative to the support wall 340. Optionally, the strip locator 304 may further include retention fasteners 355, such as set screws, that extend parallel to the pins 352 between the rail 338 and the support wall 340. The retention fasteners 355 limit the available travel distance of the rail 338 along the pins 352 to prevent over travel towards and/or away from the side wall 312 of the feed track 302.

In an exemplary embodiment, one or more springs 354 located between the support wall 340 and the rail 338 provide the biasing force that biases the rail 338 towards the side wall 312 when the springs 354 are compressed. Optionally, each pin 352 may include a corresponding spring 354 that surrounds a portion of the pin 352 between the support wall 340 and the rail 338. Alternatively, the springs 354 may be housed within the pins 352 instead of surrounding a portion of the pins 352. In an exemplary embodiment, the rail 338 is coupled to the support wall 340 by two spring-loaded pins 352, one proximate to a front 358 of the strip locator 304 and one proximate to a rear 360 of the strip locator 304. However, in other embodiments, the strip locator 304 may include other numbers and/or other arrangements of spring-loaded pins 352. For example, the springs 354 may surround a portion of the pins 352 between the rail 338 and the side wall 312 of the feed track 302, and the springs 354 may be configured to pull the rail 338 towards the side wall 312 instead of push the rail 338 from the support wall 340. As an alternative or in addition to spring-loaded pins, the biasing mechanism may include biased deflectable tabs on the rail 338 and/or on the first side 350 of the support wall 340. The rail 338 may be composed of a rigid material, such as metal, plastic, and the like. In alternative embodiments, the rail may be at least partially composed of a compressible material, such as various types of foam, where the rail itself is compressible to provide a biasing force.

Figure 4:
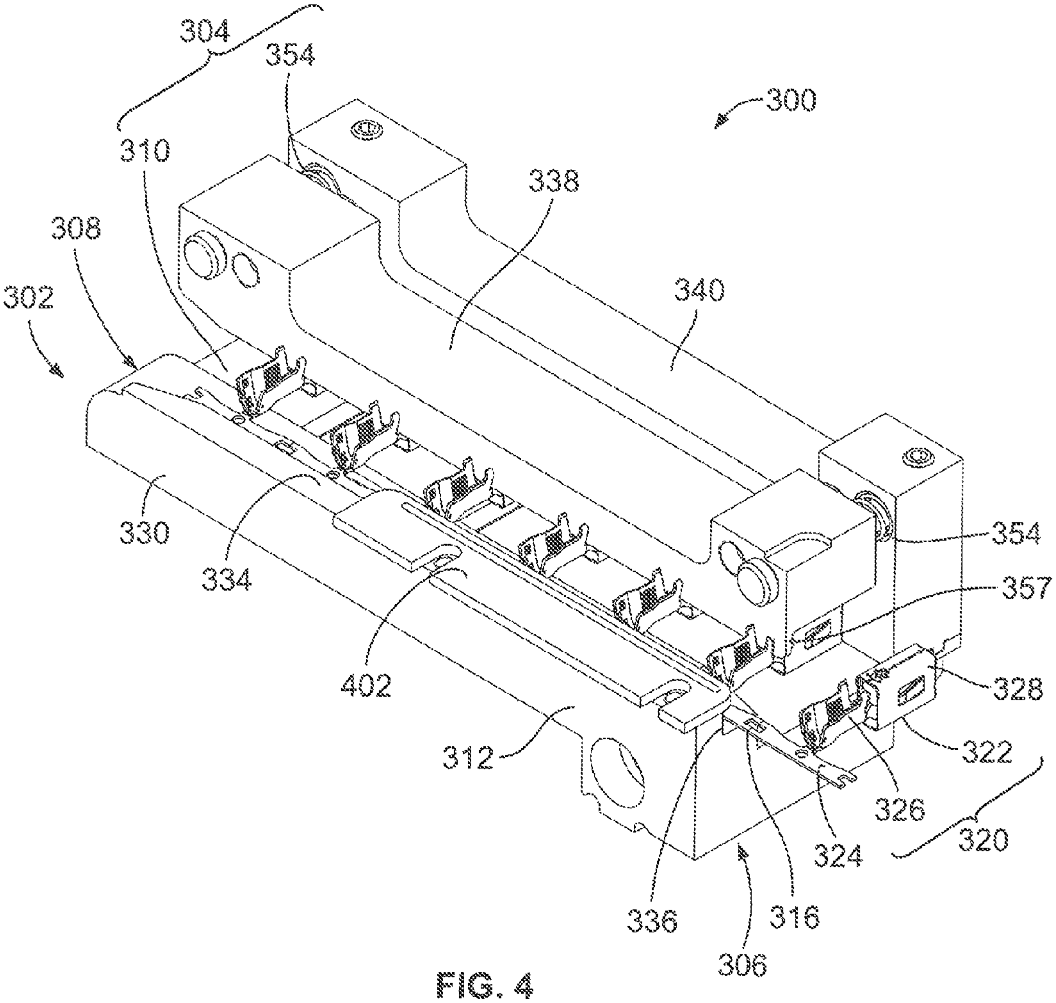
FIG. 4 is an assembled view of the feed mechanism shown in FIG. 3.

FIG. 4 is an assembled view of the feed mechanism 300 shown in FIG. 3. The terminal strip 320 is loaded onto the feed mechanism 300 and positioned on the shoulder 316. The rail 338 of the strip locator 304 is configured to contact the terminal strip 320. In an exemplary embodiment, the lip 357 of the rail 338 extends downward and is positioned between the terminal barrel 326 and terminal body 328 of each of the terminals 322 along the strip 320. The lip 357 engages the terminal barrels 326 (e.g., the pre-crimped wings that define the barrels). The lip 357 of the rail 338, biased by the springs 354 that are located between the rail 338 and the support wall 340, applies a biasing force to the barrels 326 towards the side wall 312. The terminal strip 320 is forced towards the side wall 312 such that the carrier strip 324 is pressed into contact with the fixed edge 336 of the side wall 312. While the carrier strip 324 is forced into contact with the fixed edge 336 of the side wall 312 along the first side 330 of the feed track 302, the terminals 322 of the terminal strip 320 extend from the carrier strip 324 toward the support wall 340 fixed proximate to the opposite second side 332 (shown in FIG. 3) of the feed track 302. Due to the constant biasing force by the springs 354, the terminal strip 320 may simultaneously be in contact with the fixed edge 336 on one side and the rail 338 on an opposite side. Thus, the terminal strip 320 is pressed and there are no tolerances (e.g., clearances) that would allow the terminal strip 320 room to disengage the fixed edge 336 or the rail 338. Therefore, a path is defined between the fixed edge 336 and the compressible rail 338 that directs the terminal strip 320 along the trajectory of the fixed edge 336 towards the crimping zone 208 (shown in FIG. 2).

As described above, the terminal strip 320 loaded onto the feed mechanism 300 is bounded to reduce and/or eliminate tolerances that may misalign a terminal 322 within the crimping zone 208 (shown in FIG. 2). For example, the terminal strip 320 on the feed track 302 is bounded on the first side 330 of the feed track 302 by the fixed edge 336 of the side wall 312, the terminal strip 320 is bounded towards the second side 332 (shown in FIG. 3) of the feed track 302 by the biased rail 338, and the terminal strip 320 is bounded from below by the shoulder 316 of the top plate 310. In order to bound the terminal strip 320 from above to prevent the terminal strip 320 from becoming misaligned and/or loose due to the carrier strip 324 riding up the fixed edge 336, the feed mechanism 300 may optionally include a cover plate 402. The cover plate 402 may be a flat plate that is configured to attach to the side wall 312. For example, the cover plate 402 may be fastened to the top surface 334 of the side wall 312 using fasteners, adhesives, and the like. The cover plate 402 extends parallel to the top plate 310 and at least partially above the top plate 310. When the terminal strip 320 is loaded onto the feed mechanism 300, the cover plate 402 extends above the carrier strip 324 and may extend at least partially over the terminals 322. The cover plate 402 retains the terminal strip 320 in a space defined between the cover plate 402 and the top plate 310, which prevents the carrier strip 324 from rising off of the top plate 310.

In an exemplary embodiment, the terminal strip 320 is loaded onto the feed track 302 of the feed mechanism 300 and removed from the feed track 302 by forcing the rail 338 towards the support wall 340 to a released position. The terminal strip 320 is released from the fixed edge 336 when the rail 338 is moved to the released position. By forcing the rail 338 towards the support wall 340, the springs 354 compress such that the terminal strip 320 is no longer pressed on both sides, and the terminal strip 320 may be pulled through the feed mechanism 300 either through the front 306 or the rear 308 of the feed track 302. In addition to providing a release for loading and unloading the terminal strip 320, the biased, moveable rail 338 also has the ability to accommodate various sizes and type of terminal strips without requiring manual adjustments. For example, after crimping a set of terminals having a length of 0.75 in., the feed mechanism 300 may be able to accommodate a terminal strip having terminals that are 1 in. in length because the springs 354 have the ability to compress (e.g., retract towards the support wall 340) a greater distance than with the shorter terminals to define a wider path for the terminal strip towards the crimping zone 208 (shown in FIG. 2). Therefore, an operator using the terminal crimping machine 100 (shown in FIG. 1) may be able to switch from among various sizes and/or types of terminals and/or terminal strips without having to make manual adjustments to the feed mechanism 300 which takes addition time away from crimping and may not even provide the level of alignment automatically provided by the feed mechanism 300.

Figure 5:
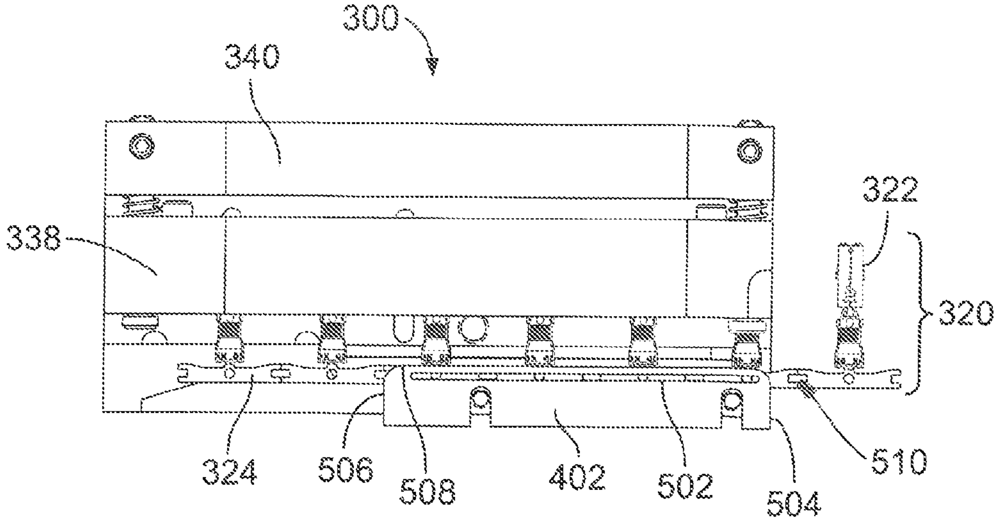
FIG. 5 shows a top-down view of the feed mechanism shown in FIG. 4.
Figure 6:
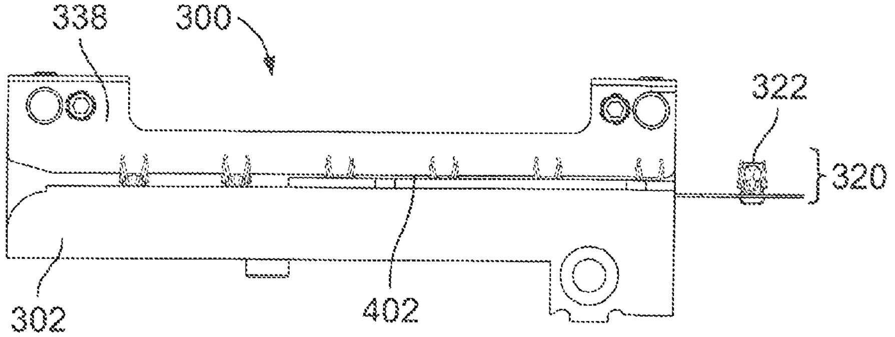
FIG. 6 shows a side view of the feed mechanism shown in FIG. 4.
Figure 7:
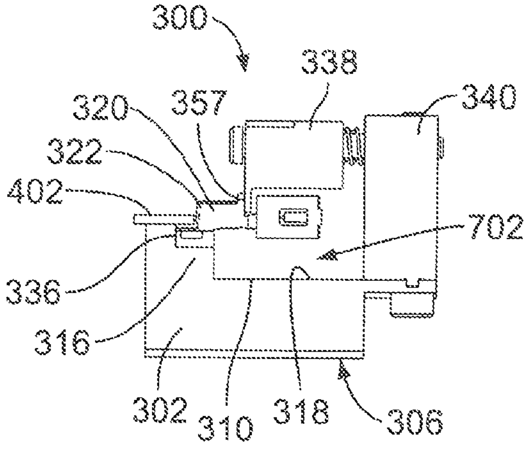
FIG. 7 shows a front view of the feed mechanism shown in FIG. 4.

FIGS. 5-7 show various views of the feed mechanism 300 shown in FIG. 4. For example, FIG. 5 shows a top-down view of the feed mechanism 300, FIG. 6 shows a side view of the feed mechanism 300, and FIG. 7 shows a front view of the feed mechanism 300. In an exemplary embodiment, the cover plate 402 includes a slot 502 that extends through the cover plate 402 and provides access to the carrier strip 324 below. The slot 502 allows the feed finger 234 (shown in FIG. 2) of the feeder device 216 (shown in FIG. 2) to pass through the cover plate 402 to engage the carrier strip 324 of the terminal strip 320. The slot 502 may extend longitudinally at least partially along a length of the cover plate 402 from a front side 504 to a rear side 506 in order to accommodate the feed stroke of the feed finger 234. In addition, the slot 502 may be positioned proximate to a side 508 of the cover plate 402 that faces the rail 338 and the support wall 340 such that the slot 502 aligns vertically with the carrier strip 324. The carrier strip 324 may be perforated with defined openings 510 along the length of the carrier strip 324.

In an exemplary embodiment, the feed finger 234 (shown in FIG. 2) extends through the slot 502 in the cover plate 402, and the tip 236 (shown in FIG. 2) of the feed finger 234 engages an opening 510 of the carrier strip 324 in order to advance the terminal strip 320 towards the crimping zone 208 (shown in FIG. 2). The feed finger 234 may be actuated with enough force in the feed direction 238 (shown in FIG. 2) to overcome the frictional resistance to movement provided by the fixed edge 336 and the biased rail 338 pressing against the terminal strip 320 on corresponding sides. The friction from the applied pressing forces provides the added benefit of preventing or at least limiting unintentional movement of the terminal strip 320 in the reverse feed direction 240 (shown in FIG. 2). The unintentional reverse movement may occur at the beginning and/or the end of the feed stroke, such as when the feed finger 234 first engages the carrier strip 324 and/or when the feed finger 234 disengages the carrier strip 324. Therefore, the feed mechanism 300 may obviate the need for an additional drag component designed to prevent unintentional reverse movement.

In an embodiment, the rail 338 does not make direct contact with the feed track 302. Instead, the rail 338 indirectly contacts the feed track 302 through the support wall 340 which is fixed to the feed track 302, and through the terminal strip 320 which contacts the shoulder 316 of the feed track 302. In addition, because the shoulder 316 is stepped up from the planar surface 318 of the top plate 310, a gap 702 or cavity may form under the terminals 322 and above planar surface 318. As shown in FIG. 7, the terminal strip 320 is bounded from below by the shoulder 316, from above by the carrier plate 402, from one side by the fixed edge 336, and from the opposite side by the lip 357 of the rail 338.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A feed mechanism for a terminal crimping machine comprising:

a feed track having a top plate and a side wall, the top plate extending from a front of the feed track to a rear of the feed track, the top plate configured to receive thereon a terminal strip having a plurality of terminals arranged along a carrier strip, the terminal strip configured to be moved from the rear to the front towards a crimping zone of the terminal crimping machine, the side wall having a fixed edge above the top plate; and a strip locator coupled to the feed track, the strip locator including a rail movably coupled to a support wall, the support wall being fixed relative to the feed track, the rail being biased against the terminal strip to force the terminal strip against the fixed edge of the side wall.

2. The feed mechanism of claim 1, wherein the side wall extends along a first side of the feed track, the support wall is fixed proximate to an opposite second side of the feed track, and the rail being located between the side wall and the support wall, the rail being moveable toward and away from the side wall.

3. The feed mechanism of claim 1, wherein the support wall of the strip locator includes a protrusion extending from a bottom side of the support wall that engages a groove defined in the top plate of the feed track to align the support wall with the feed track.

4. The feed mechanism of claim 1, further comprising a cover plate configured to attach to the side wall of the feed track and extend parallel to the top plate, the terminal strip being retained in a space defined between the cover plate and the top plate.

5. The feed mechanism of claim 4, wherein the cover plate includes a slot extending through the cover plate that allows a feed finger of a feeder device to pass therethrough to access the carrier strip of the terminal strip to advance the terminal strip towards the crimping zone.

6. The feed mechanism of claim 1, wherein the rail is coupled to the support wall using one or more springs to provide the biasing force that forces the terminal strip against the fixed edge of the side wall.

7. The feed mechanism of claim 1, wherein the rail is movable to a released position by forcing the rail toward the support wall, the terminal strip being released from the fixed edge when the rail is moved to the released position.

8. The feed mechanism of claim 1, wherein the rail of the strip locator comprises a lip that extends downward from the rail, the lip being positioned between a terminal barrel and a terminal body of each of the terminals and engages the terminal barrels.

9. The feed mechanism of claim 1, wherein the top plate comprises a shoulder adjacent to the fixed edge of the side wall, the shoulder configured to receive thereon the terminal strip.

10. A feed mechanism for a terminal crimping machine comprising:

a feed track having a top plate and a side wall, the top plate extending from a front of the feed track to a rear of the feed track, the top plate configured to receive thereon a terminal strip having a plurality of terminals arranged along a carrier strip, the side wall having a fixed edge above the top plate;

a feeder device including a feed actuator operatively connected to a feed finger, the feed actuator configured to cause the feed finger to mechanically advance the terminal strip from the rear to the front towards a crimping zone of the terminal crimping machine; and a strip locator coupled to the feed track, the strip locator including a rail movably coupled to a support wall, the support wall being fixed relative to the feed track, the rail being biased against the terminal strip to force the terminal strip against the fixed edge of the side wall.

11. The feed mechanism of claim 10, wherein the rail does not make direct contact with the feed track.

12. The feed mechanism of claim 10, wherein the rail is coupled to the support wall by plural pins, each pin including a spring surrounding a portion of the pin between the rail and the support wall, wherein the springs provide the biasing force that forces the terminal strip against the fixed edge of the side wall.

13. The feed mechanism of claim 10, wherein the carrier strip of the terminal strip is forced into contact with the fixed edge of the side wall along a first side of the feed track, the terminals of the terminal strip extending from the carrier strip toward the support wall which is fixed proximate to an opposite second side of the feed track.

14. The feed mechanism of claim 10, further comprising a cover plate attached to the side wall of the feed track and extending above the carrier strip of the terminal strip on the top plate, the feed finger extends through a slot in the cover plate to engage the carrier strip, the feed finger configured to advance the terminal strip towards the crimping zone.

15. An applicator for a terminal crimping machine comprising:

a crimping mechanism including an anvil and a movable ram, the anvil located in a crimping zone and configured to receive a terminal thereon, the ram having crimp tooling configured to crimp the terminal located on the anvil to a wire during a crimp stroke of the ram;

a feed track having a top plate and a side wall, the top plate extending from a front of the feed track to a rear of the feed track, the top plate configured to receive thereon a terminal strip having a plurality of the terminals arranged along a carrier strip, the side wall having a fixed edge above the top plate;

a feeder device including a feed actuator operatively connected to a feed finger, the feed actuator configured to cause the feed finger to mechanically advance the terminal strip from the rear to the front towards the crimping zone; and a strip locator coupled to the feed track, the strip locator including a rail movably coupled to a support wall, the support wall being fixed relative to the feed track, the rail being biased against the terminal strip to force the terminal strip against the fixed edge of the side wall.

16. The applicator of claim 15, wherein the applicator is at least one of a side-feed type applicator or an end-feed type applicator.

17. The applicator of claim 15, wherein the rail is coupled to the support wall by plural pins, each pin including a spring surrounding a portion of the pin between the rail and the support wall, wherein the springs provide the biasing force that forces the terminal strip against the fixed edge of the side wall.

18. The applicator of claim 15, wherein the terminal strip is bounded on a first side by the fixed edge of the side wall, bounded on an opposite second side by the rail, bounded below by the top plate, and bounded above by a cover plate attached to the side wall, such that the terminal strip has negligible tolerances in both a side-to-side direction and an up-and-down direction.

19. The applicator of claim 15, wherein the anvil in the crimping zone is located in front of the front of the feed track.

20. The applicator of claim 15, wherein the rail of the strip locator comprises a lip that extends downward from the rail, the lip being positioned between a terminal barrel and a terminal body of each of the terminals and engages the terminal barrels.

* * * * *